United States Patent Office 3,024,146
Patented Mar. 6, 1962

3,024,146
SILICONE RUBBER ADHESIVE CONTAINING TREATED FILLER
Arthur M. Bueche and Curtis S. Oliver, Schenectady, N.Y., assignors to General Electric Company, a corporation of New York
No Drawing. Filed Aug. 4, 1958, Ser. No. 753,117
12 Claims. (Cl. 154—43)

This invention is concerned with novel silicone rubber adhesives. More particularly, the invention relates to a silicone rubber adhesive capable of maintaining its properties at low temperatures and at high temperatures in the presence of moisture, said adhesive comprising (1) the product of reaction under heat of a mixture of ingredients comprising (a) an alkali-metal salt of an organopolysiloxane convertible to the cured solid elastic state, e.g., the alkali metal being selected from the class consisting of potassium, cesium, and rubidium, and (b) an organopolysiloxane convertible to the cured solid elastic state, (2) a trialkylchlorosilane-treated silica aerogel filler, and (3) a curing agent for (1).

Mechanical fasteners have been used extensively for keeping parts together, for instance, in the refrigerator art where it is desired to fasten together heating wires on refrigerator evaporators. However, the use of mechanical fasteners involves considerable labor and materials and is often quite expensive. One of the objectives of eliminating these mechanical fasteners in this particular application is to use an adhesive which can be applied readily and inexpensively and is capable of bonding the heating wires to the refrigerator evaporators. Normally, these wires are covered with frost which builds up on the evaporator. During the defrosting operation, the wires become warm and in some instances quite hot. And adhesive used for this purpose must therefore be effective, both at high and low temperatures in the presence of high humidity such as the frosted evaporator.

Heretofore adhesives used for this purpose have failed because of one of the following reasons: they are brittle at low temperatures; they are incapable of withstanding the high temperatures; they often contain solvents which when these escape leave voids; often the filler in the adhesive acts as a wick, drawing moisture into the adhesive; and finally, the adhesive strength or the strength of the rubber is low. There are also other applications where an adhesive is desired for similar purposes, as, for instance, sealing metals to metals, splicing and adhering parts whose surfaces are made of cured silicone rubber, making glass seals, etc.

Unexpectedly, we have discovered that a certain type of silicone rubber composition is admirably suitable for adhering the various parts described above and particularly for the application of adhering heating wires to refrigerator evaporators. In accordance with our invention, we employ as the adhesive for the purpose, a mixture of ingredients comprising (1) the product of reaction under heat of (a) an alkali metal salt of an organopolysiloxane convertible to the cured solid elastic state (hereinafter referred to for exemplary purposes as "potassium polysiloxanolate" but it being unstood that "cesium polysiloxanolates" and "rubidium polysiloxanolates" are also intended to be included), and (b) an organopolysiloxane convertible to the cured solid elastic state, (2) a trialkylchlorosilane-treated silica aerogel filler, and (3) a curing agent for (1).

The term "potassium polysiloxanolate" is intended to means the product of reaction in the presence of heat between an organopolysiloxane convertible to the cured solid elastic state and potassium hydroxide (or cesium hydroxide for the cesium salt, and rubidium hydroxide for the rubidium salt). One method for making these potassium polysiloxanolates comprises, first, interacting on a weight basis from 0.075 to 3 parts KOH per part of a convertible organopolysiloxane at a temperature of from about 75-160° C. for times ranging from about 0.5 to 4 hours or more. This can be done by heating the mixture of ingredients at the elevated temperatures while stirring the ingredients; or else the potassium hydroxide and the convertible organopolysiloxane can be milled on heated rolls to give the desired potassium polysiloxanolate. It will be found that the latter product is a somewhat stiff but still flexible composition.

The convertible organopolysiloxanes from which the potassium polysiloxanolate is made or which is used as the bulk of the adhesive, may be highly viscous masses, or gummy elastic solids, depending on the state of condensation, the condensing agent employed, the starting organopolysiloxane used to make the curable organopolysiloxanes, etc. Although curable organopolysiloxanes with which the present invention is concerned are well known, for purposes of showing persons skilled in the art the various organopolysiloxanes which may be employed in the practice of the present invention, attention is directed to the curable organopolysiloxanes disclosed and claimed in Agens Patent 2,448,756; Sprung et al. Patent 2,448,556; Sprung Patent 2,484,595; Krieble et al. Patent 2,457,688; Hyde Patent 2,490,357; Marsden Patent 2,521,528; and Warrick Patent 2,541,137.

It will, of course, be understood by those skilled in the art that other curable organopolysiloxanes containing the same or different silicon-bonded organic substituents, (alkyl, e.g. methyl, ethyl, propyl, butyl, octyl, etc.; alkenyl, e.g. vinyl, allyl, etc.; cycloalkenyl, e.g. cyclohexenyl, etc.; aryl, e.g. phenyl, tolyl, xylyl, naphthyl, etc.; aralkyl, e.g. benzyl, phenylethyl, etc.; halogenated aryl, e.g. chlorophenyl, dibromophenyl, etc.; cycloalkyl, e.g. cyclohexyl, etc.; alkinyl, e.g. ethinyl, etc.; both methyl and phenyl, etc., radicals) connected to silicon atoms by carbon-silicon linkages, may be employed without departing from the scope of the invention.

The particular curable organopolysiloxane used is not critical and may be any one of those described in the foregoing patents and is generally obtained by condensing a liquid organopolysiloxane containing an average of from about 1.9 to 2.1 preferably from about 1.98 to about 2.01, silicon-bonded organic groups per silicon atom. The usual condensing agents which may be employed and which are well known in the art may include, for instance, acid condensing agents, e.g. ferric chloride hexahydrate, phenyl phosphoryl chloride, and the like; alkaline condensing agents, e.g. quaternary phosphonium hydroxides and alkoxides, solid quaternary ammonium hydroxides, potassium hydroxide, cesium hydroxide, etc. These curable organopolysiloxanes generally comprise polymeric diorganosiloxanes which may contain, for example, from 0 to 2 mole percent copolymerized monoorganosiloxane, for example, copolymerized monomethylsiloxane. Generally, we prefer to use as the starting organopolysiloxane from which the curable organopolysiloxanes are prepared, one which contains about 1.98 to 2.01, inclusive, organic groups, for example, methyl groups, per silicon atom where more than about 90% of the silicon atoms in the polysiloxane contain two silicon-bonded alkyl groups.

The starting organopolysiloxanes used to make the curable organopolysiloxanes by condensation thereof preferably comprise organic substituents consisting essentially of monovalent organic radicals attached to silicon through carbon-silicon linkages and in which the siloxane units consist of units of the structural formula $R_2SiO$ where $R$ is preferably a radical of the group consisting of methyl and phenyl radicals. At least 50% of the total number of R groups are preferably methyl radicals. The polysiloxane may be one in which all of the siloxane units are $(CH_3)_2SiO$ or the siloxane may be a copolymer of dimethylsiloxane and a minor amount (e.g., from 1 to 20 mole percent) of any of the following units alone or in combination therewith: $C_6H_5(CH_3)SiO$ and $(C_6H_5)_2SiO$.

One method for making an organopolysiloxane convertible to the cured solid elastic state, for instance, a convertible methylpolysiloxane, comprises heating octamethylcyclotetrasiloxane with about 0.001 to 0.01%, by weight, thereof, KOH at a temperature of from about 140 to 160° C. for times ranging from 4 to 8 hours. There is thus obtained a convertible organopolysiloxane which is a highly viscous scarcely flowable material soluble in toluene.

The silica filler which is treated in accordance with the practice of our invention is a critical one and unexpectedly it has been found that the use of similar silica fillers would not give the same results. Thus we have found that the treated silica employed in the practice of the present invention is preferably one which has been treated with a trialkyl halosilane, for instance, trimethylchlorosilane and particularly silica aerogel which has been rendered hydrophobic by treating with the trialkyl halosilane. If one employs, for instance, estersil silica fillers, that is silica fillers which have been treated to form silicon-bonded alkoxy groups on the surface of the silica particles in the manner described in Iler Patent 2,657,149, and such filler is used in place of the trialkylchlorosilane-treated silica, one will not obtain the same properties or results as are obtained if one employs silica aerogel treated in acordance with the practice of our invention.

An example of silica aerogel which can be employed is Santocel C, marketed by Monsanto Chemical Company, which has a specific surface area of about 160 square meters per gram. Such silica aerogels are conveniently made by raising a silica gel to the critical temperature of the liquid contained therein while maintaining the pressure on the system sufficiently high to insure that the liquid phase will remain a liquid until the critical temperature is reached. At this point the liquid will be converted into the gaseous state without the formation of menisci at the gas-liquid interface. The degree of porosity may be controlled to a large degree by controlling the concentration of the silica in the gel as it is precipitated. These aerogels may be used in this condition or they may be ground to a finer state of subdivision. More specific directions for preparing such silica aerogels may be found described in the copending application of Bueche et al., Serial No. 531,829, filed August 31, 1955, now abandoned, and assigned to the same assignee as the present invention.

The manner whereby silica aerogel may be treated with the trialkyl chlorosilane, for instance, trimethylchlorosilane, triethylchlorosilane, trimethylbromosilane, etc. is also described in the above-mentioned Bueche et al. application, Serial No. 531,829. In one typical example described in the aforesaid application, a slurry of about 50 parts of a silica aerogel and 340 parts trimethylchlorosilane was stirred at 180° C. for about one-half hour in a glass reactor equipped with a reflux condenser. Vacuum was then applied to the system for another one-half hour to remove excess trimethylchlorosilane and HCl formed. The resulting powder was placed in a drying oven and dried under atmospheric pressure at 250° C. for 18 hours to remove the last traces of HCl. This process will yield a hydrophobic silica aerogel which will float on the top of boiling water in contrast to untreated silica aerogel which will fall to the bottom of the water. Even the use of a toluene-water system will still be unable to cause solution of the water-repellent film on the silica gel and the latter will still float on the surface of the toluene-water system. The aforementioned Bueche et al. application Serial No. 531,829 contains other methods for treating the silica aerogel and also mentioned other trialkyl halogenosilanes which can be employed. By reference, this application is made part of the disclosures of the instant application.

In making adhesive compositions herein disclosed and claimed, a mixture is formed of from 0.2 to 8 parts, by weight, of the potassium polysiloxanolate per 100 parts of the convertible organopolysiloxane and the mixture is heated (e.g., by milling) to about 75° to 150° C. for a time sufficient to effect thorough mixing of the ingredients and to form a homogeneous mixture. This will generally require from about 10 to 30 minutes, depending upon the temperature used. The product thus obtained will be somewhat "soupy" and we have found it advantageous at this point to add from about 5 to 15 parts of the treated filler per 100 parts of the heated-interacted product. There will thus be obtained a pasty composition to which is then added the remainder of the amount of treated filler which is to be used in the final application.

After interaction of the potassium polysiloxanolate and the convertible organopolysiloxane, and addition of the treated filler, a curing agent for the convertible organopolysiloxane is added, for instance, an organic peroxide such as benzoyl peroxide, tertiary butyl perbenzoate, bis-(2,4-dichlorobenzoyl) peroxide, dietertiary butyl peroxide, etc. Exclusive of the peroxide which may be present in an amount equal to from 0.1 to 8%, by weight, based on the total weight of heat-reacted organopolysiloxane, the ingredients, namely, the organopolysiloxane paste and the treated filler may be present, by weight, in amounts described in the following table.

| Ingredient: | Amount, parts |
|---|---|
| Organopolysiloxane paste | 100 |
| Treated silica areogel | 10 to 100 |

In order to obtain good adhesive bonds, it is generally desirable to heat the surface adhered by means of the above-described adhesives, for times varying from about one minute to two hours at temperatures ranging from about 100° to 250° C., advantageously under pressures of about 5 to 100 p.s.i. Generally when adhering metallic surfaces by means of the above-described adhesive, it may be desirable in connection with certain metal surfaces to clean the metal prior to applying the adhesive, using a mixture such as a $H_2SO_4$—$K_2Cr_2O_7$ mixture.

The above adhesives can be used to adhere various metallic surfaces, such as aluminum, copper, brass, nickel, etc., to themselves or to other types of metals, to effect adhesion between silicone rubber or silicone resin surfaces, to effect adhesion between glass surfaces and metal or plastic surfaces, etc.

In order that those skilled in the art may better understand how the present invention may be practiced, the following examples are given by way of illustration and not by way of limitation. All parts are by weight.

*Example 1*

A convertible methylpolysiloxane was obtained by heating octamethylcyclotetrasiloxane with 0.001 percent, by weight, of KOH, for from 6 to 8 hours at temperatures of about 140° to 150° C., until a highly viscous, scarcely flowable convertible methylpolysiloxane was obtained. The molecular weight of this convertible methylpolysiloxane was about 700,000 to 800,000.

*Example 2*

Ten parts of the convertible methylpolysiloxane of Example 1, one part of KOH and one part of ethanol were mixed together and heated in an air circulating oven for one hour at 100° C. and thereafter for two hours at 150° C. This resulted in a turbid, rigid, rubbery product comprising a potassium salt of the convertible methylpolysiloxane.

*Example 3*

About 25 parts of the convertible methylpolysiloxane of Example 1 and 0.1 part of the potassium salt of the methylpolysiloxane of Example 2 were mixed with 10 parts of a silica areogel which had been treated with trimethylchlorosilane in the manner described in the above-identified Bueche et al. application, Serial No. 531,829. About 0.5 part benzoyl peroxide was homogeneously added to the mixture, and the resulting adhesive rubber composition, in the form of a paste was spread as a thin film on strips of aluminum foil, the two strips placed one on the other with contacting coated surfaces, and cured for about 30 minutes at 150° C. in an oven. A good adhesive bond was formed between the rubber and the aluminum, even though the aluminum had not been cleaned prior to application of the adhesive. The bond thus obtained was of the order of about 200 to 300 p.s.i.

*Example 4*

In this example, one part of KOH and 10 parts of the above-described convertible methylpolysiloxane were mixed together on hot mill rolls, maintaining a temperature of about 100° C. for about 15 to 20 minutes. While at 100° C., the potassium salt of the methylpolysiloxane thus obtained was added to the above-described convertible methylpolysiloxane in various proportions and the aforementioned trimethylchlorosilane-treated silica areogel was added and milled for about 10 minutes. Using a base rubber formulation of 25 parts of convertible organopolysiloxane, 10 parts of treated silica aerogel, and 0.05 part benzoyl peroxide, the amount of the potassium methylpolysiloxanolate was varied from 0.05 part to 0.2 part. Aluminum surfaces adhered by means of the various formulations recited above and cured for 10 minutes at about 125° C., and for an additional one hour at 150° C. showed good adhesive strength and even after 8 days at 250° C. in an air circulating oven, strengths of 200–300 p.s.i. were still obtained in the adhesive layer.

The bonds to aluminum of the samples of Example 4 showed no evidence of deterioration after steaming or freezing and thawing many times. One set of samples was alternately frozen at about −15° C. in a refrigerator and then thawed with hot water. This was done for 3 or 4 times a day for two weeks. Another set of the aluminum samples adhered by the adhesive of Example 4 was held in steam over boiling water for 7 days. In neither case was any change in adhesion properties detected.

*Example 5*

Employing the same procedure as described in Examples 3 and 4, one can prepare an alkali metal salt for instance a cesium salt of a methylpolysiloxane convertible to the cured solid elastic state and thereafter effect interaction under heat between said cesium polysiloxanolate and another convertible organopolysiloxane, such as a convertible methyl phenylpolysiloxane. This heat-interacted product can then be mixed with trimethylchlorosilane-treated silica aerogel and a peroxide such as benzoyl peroxide and employed for adhering various surfaces similarly as was done in the preceding examples.

In addition to employing the above-described pastes, one can also dissolve and disperse these pastes in suitable inert liquids which act as both a solvent for the organopolysiloxane portion of the paste and as a dispersion medium for the solid insoluble portion of the paste such as the treated silica aerogel and curing agent. Such solution-dispersions can be used to treat various tape materials such as organic tapes, metallic tapes, to coat the latter, and the solvent removed by suitable means. Such tapes can be employed for the purposes mentioned above as well as for insulation purposes as pressure sensitive adhesives.

It will, of course, be apparent to those skilled in the art that other proportions of ingredients including the potassium polysiloxanolate, the convertible organopolysiloxane, the treated silica aerogel filler and the organic peroxide, as well as other types of trialkyl chlorosilane-treated silica aerogels and other types of potassium polysiloxanolates, convertible organopolysiloxanes, together with other types of peroxy curing agents may be employed in place of those described in the foregoing examples without departing from the scope of the invention.

In addition, either cesium hydroxide or rubidium hydroxide can be used in place of the potassium hydroxide, to make the alkali-metal salt of the convertible organopolysiloxane employed in the preceding examples.

The above adhesive compositions in addition to being used as adhesives for various metallic surfaces can also be applied to aluminum foil backings, and these treated foils (in the form of tapes) used as pressure sensitive adhesive tapes for sealing resistance wires to evaporator sections of refrigerators. Evaporator sections thus made have been subjected to alternate freezing in water and steam, and such tests have shown that the adhesive is undamaged after many of the above-described cycles. These adhesives have good shelf life and can be stored at room temperature without any detectable change in properties.

What we claim as new and desire to secure by Letters Patent of the United States is:

1. An adhesive composition of matter comprising (1) the product of reaction under heat of a mixture of ingredients composed of (a) an alkali-metal salt of a convertible organopolysiloxane wherein the alkali metal is selected from the class consisting of potassium, cesium and rubidium, the said alkali-metal salt having been obtained by heating a mixture comprising on a weight basis, from 0.075 to 3 parts of an alkali-metal hydroxide and one part of a convertible organopolysiloxane, and (b) an additional amount of a convertible organopolysiloxane, there being employed, on a weight basis, from 0.2 to 8 parts of (a) per 100 parts of (b), and (2) a trialkyl-halogenosilane-treated silica aerogel, the aforesaid organopolysiloxanes of (a) and (b) both being convertible to the cured, solid, elastic state and containing an average of from 1.98 to 2.01 organic groups per silicon atom attached to silicon by carbon-silicon linkages wherein the organic groups are selected from the class consisting of alkyl, aryl, aralkyl, alkaryl, cycloalkyl and alkenyl radicals.

2. An adhesive composition as in claim 1 wherein the convertible organopolysiloxane is a convertible methylpolysiloxane containing an average of from 1.99 to 2.01 methyl groups per silicon atom.

3. An adhesive composition as in claim 1 wherein the convertible organopolysiloxane is a convertible methyl phenylpolysiloxane containing an average of from 1.99 to 2.01 total methyl and phenyl groups per silicon atom.

4. An adhesive composition of matter comprising (1) the product of reaction under heat of a mixture of ingredients composed of (a) a potassium salt of a convertible organopolysiloxane, said potassium salt having been obtained by heating a mixture comprising, by weight, from 0.075 to 3 parts of potassium hydroxide and one part of a convertible organopolysiloxane, and (b) an additional amount of a convertible organopolysiloxane, there being employed, on a weight basis, from 0.2 to 8 parts of (a) per 100 parts of (b), and (2) a trialkyl-chlorosilane-treated silica aerogel, the aforesaid organopolysiloxanes of (a) and (b) both being convertible to the cured, solid, elastic state and containing an average of from 1.98 to 2.01 organic groups per silicon atom attached to silicon by carbon-silicon linkages wherein the organic groups are selected from the class consisting of alkyl, aryl, aralkyl, alkaryl, cycloalkyl and alkenyl radicals.

5. An adhesive composition of matter comprising (1) the product of reaction under heat of a mixture of ingrediense composed of (a) an alkali-metal salt of a convertible organopolysiloxane wherein the alkali metal is selected from the class consisting of potassium, cesium and rubidium, the said alkali-metal salt having been obtained by heating a mixture comprising on a weight basis, from 0.075 to 3 parts of an alkali-metal hydroxide and one part of a convertible organopolysiloxane, and (b) an additional amount of a convertible organopolysiloxane, there being employed, on a weight basis, from 0.2 to 8 parts of (a) per 100 parts of (b), (2) a trialkylchlorosilane-treated silica aerogel, and (3) a peroxy curing agent for (1), the aforesaid organopolysiloxanes of (a) and (b) being convertible to the cured, solid, elastic state and containing an average of from 1.98 to 2.01 organic groups per silicon atom attached to silicon by carbon-silicon linkages wherein the organic groups are selected from the class consisting of alkyl, aryl, aralkyl, alkaryl, cycloalkyl and alkenyl radicals.

6. The heat treated composition of claim 5.

7. An adhesive composition of matter comprising (1) the product of reaction under heat of a mixture of ingredients composed, by weight, of (a) from 0.2 to 8 parts of a potassium salt of a methylpolysiloxane convertible to the cured solid elastic state, the said potassium salt having been obtained by heating a mixture comprising, by weight, from 0.075 to 3 parts of potassium hydroxide and one part of a convertible methylpolysiloxane, and (b) 100 parts of the same convertible methylpolysiloxane, the said methylpolysiloxanes containing from 1.98 to 2.01 methyl groups per silicon atom, (2) trimethylchlorosilane-treated silica aerogel, and (3) an organic peroxy curing agent for (1).

8. A composition as in claim 7 wherein the curing agent is benzoyl peroxide.

9. The heat treated composition of claim 7.

10. The heat treated composition of claim 8.

11. An adhered assembly composed of two solid surfaces bonded to each other by means of a cured adhesive composition comprising (1) the product of reaction under heat of a mixture of ingredients composed of (a) an alkali-metal salt of a convertible organopolysiloxane wherein the alkali metal is selected from the class consisting of potassium, cesium, and rubidium, the said alkali-metal salt having been obtained by heating a mixture comprising, by weight, from 0.075 to 3 parts of an alkali-metal hydroxide and one part of a convertible organopolysiloxane, and (b) an additional amount of a convertible organopolysiloxane, there being employed, on a weight basis, from 0.2 to 8 parts of (a) per 100 parts of (b), (2) a trialkylchlorosilane-treated silica aerogel, and (3) a curing agent for (1), the aforesaid organopolysiloxanes of (a) and (b) both being convertible to the cured, solid, elastic state and containing an average of from 1.98 to 2.01 organic groups per silicon atom attached to silicon by carbon-silicon linkages wherein the organic groups are selected from the class consisting of alkyl, aryl, aralkyl, alkaryl, cycloalkyl and alkenyl radicals.

12. An adhered assembly composed of two solid surfaces bonded to each other by means of a cured adhesive composition comprising (1) the product of reaction under heat of a mixture of ingredients composed of (a) a potassium salt of a convertible methylpolysiloxane, the said potassium salt having been obtained by heating a mixture comprising, by weight, from 0.075 to 3 parts potassium hydroxide and one part of a convertible methylpolysiloxane, and (b) an additional amount of a convertible methylpolysiloxane, there being employed, on a weight basis, from 0.2 to 8 parts of (a) per 100 parts of (b), (2) a trimethylchlorosilane-treated silica aerogel, and (3) benzoyl peroxide, the above methylpolysiloxanes of (a) and (b) both being convertible to the cured, solid, elastic state and having an average of from about 1.98 to 2.01 methyl groups per silicon atom.

References Cited in the file of this patent

UNITED STATES PATENTS

| | | |
|---|---|---|
| 2,490,357 | Hyde | Dec. 6, 1949 |
| 2,567,110 | Hyde | Sept. 4, 1951 |
| 2,634,284 | Hyde | Apr. 7, 1953 |

FOREIGN PATENTS

| | | |
|---|---|---|
| 697,057 | Great Britain | Sept. 16, 1953 |
| 766,665 | Great Britain | Jan. 23, 1957 |